Figure 1:
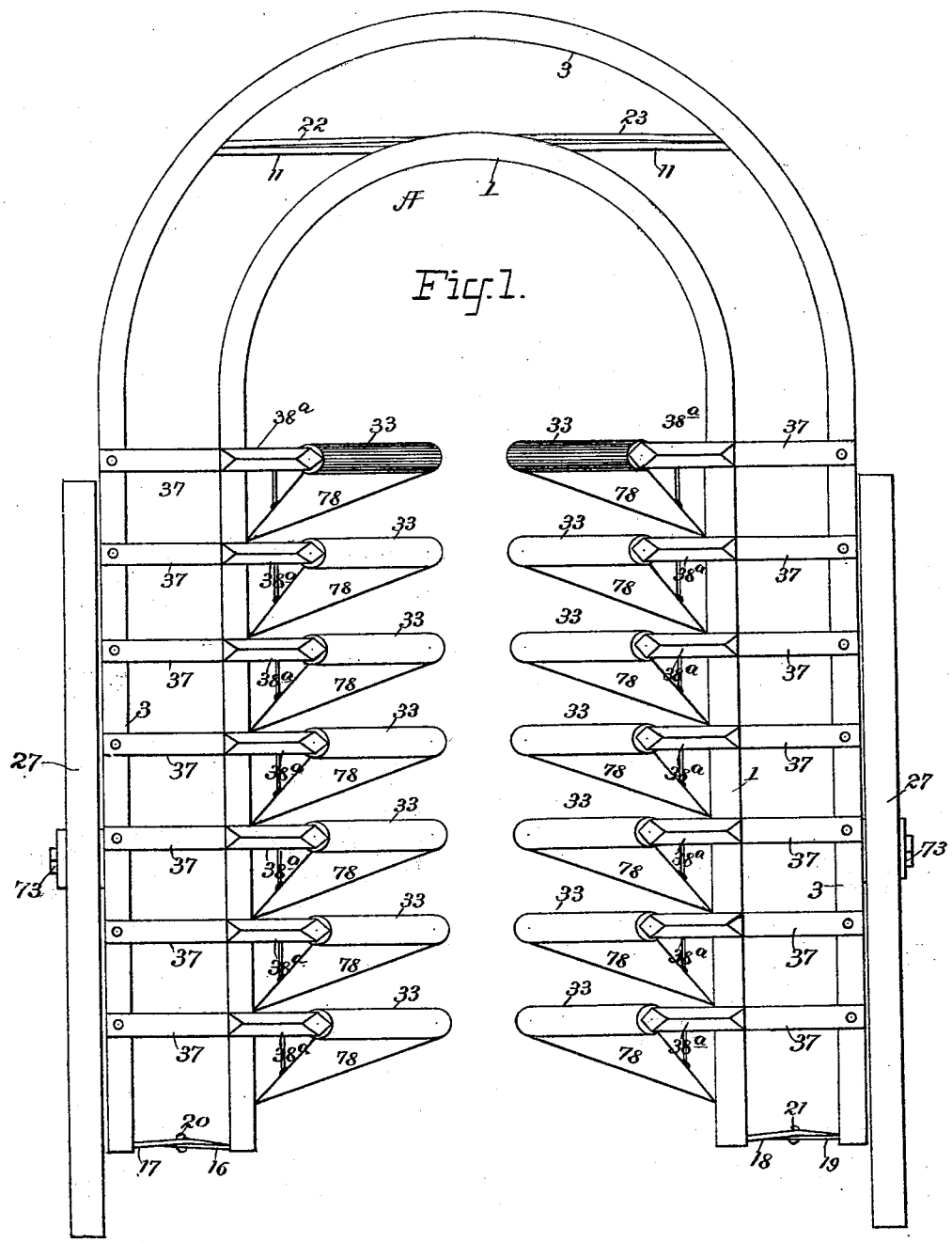

(No Model.) 6 Sheets—Sheet 2.

G. LISPENARD.
COTTON HARVESTER.

No. 517,409. Patented Mar. 27, 1894.

ATTEST:
H. F. Dunbar
M. F. Daly

INVENTOR:
George Lispenard
By Joseph L. Levy
Atty (No Model.)  6 Sheets—Sheet 3.
G. LISPENARD.
COTTON HARVESTER.
No. 517,409.  Patented Mar. 27, 1894.
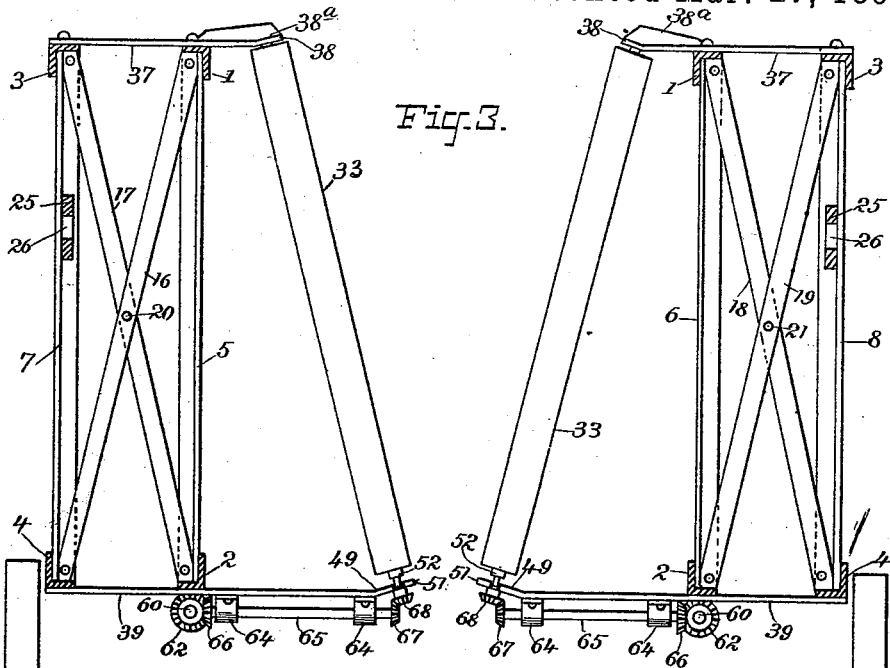
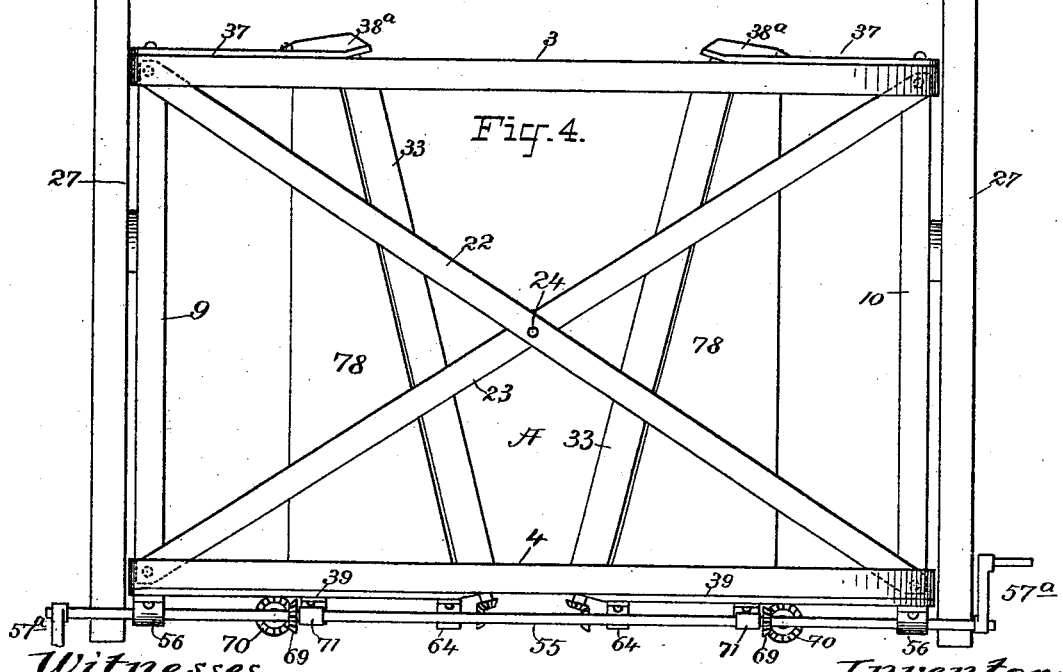
Witnesses,
C. W. Benjamin.
M. F. Daly.
Inventor;
George Lispenard
By Joseph L. Levy
Att'y

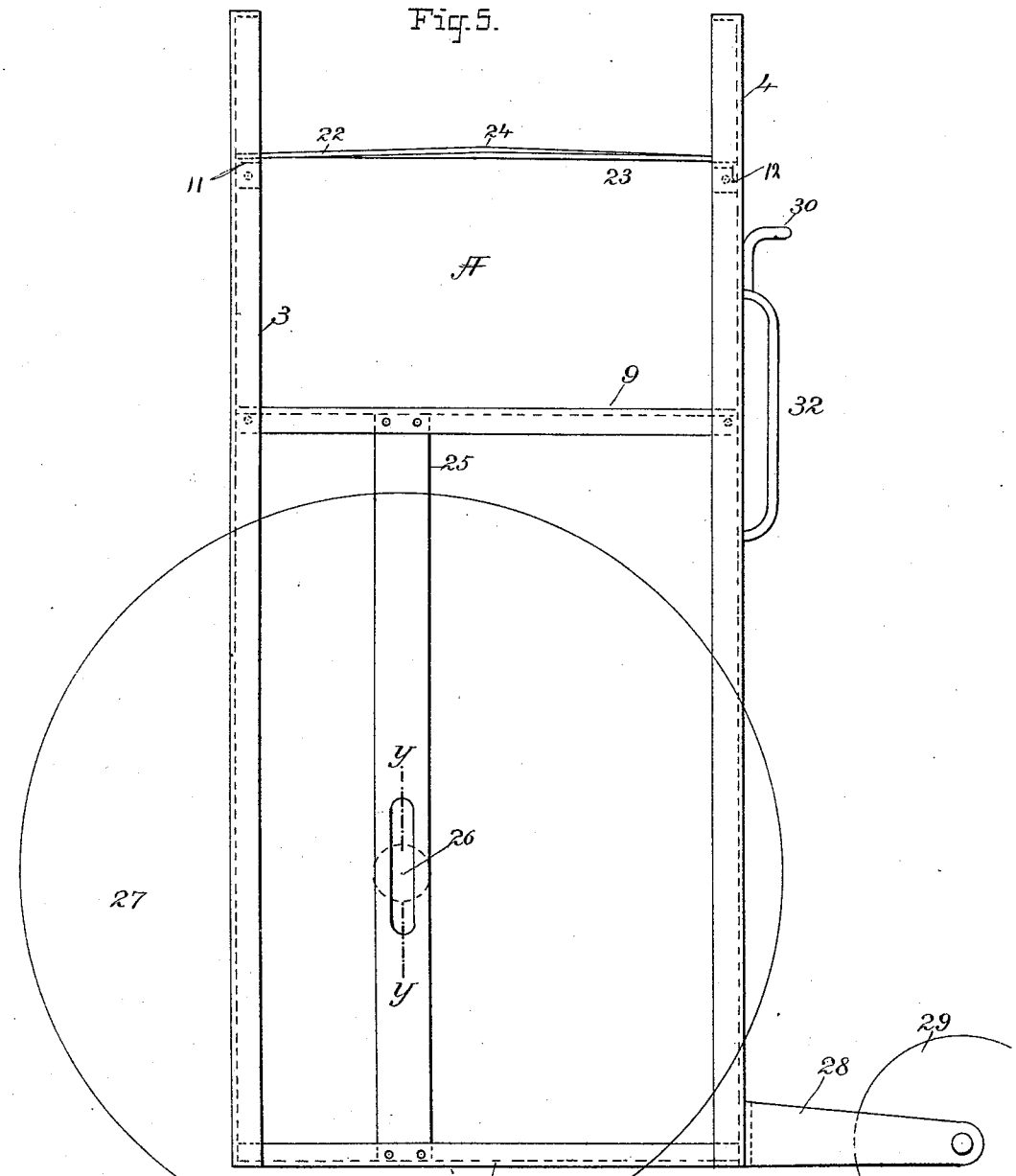

(No Model.)  6 Sheets—Sheet 5.
G. LISPENARD.
COTTON HARVESTER.
No. 517,409.  Patented Mar. 27, 1894.
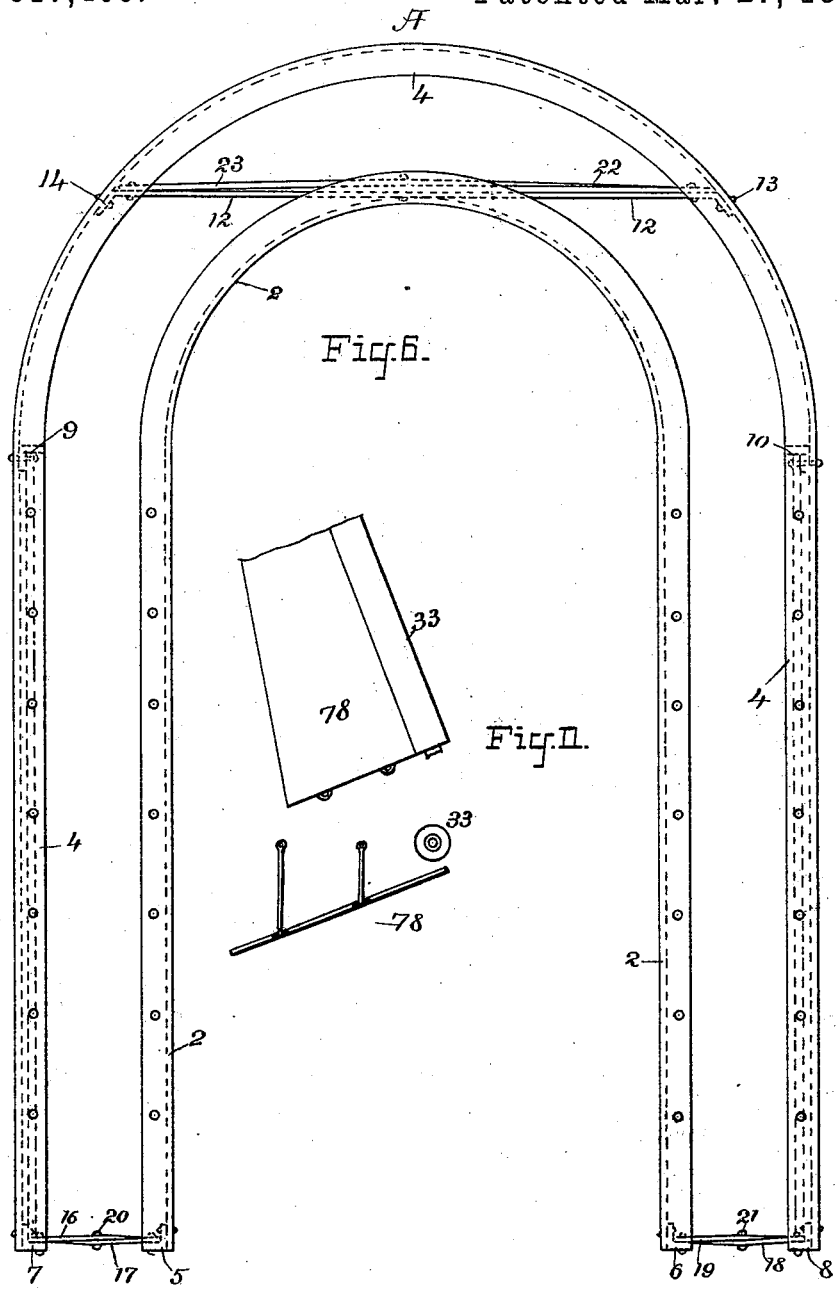
WITNESSES:
M. F. Daly
H. F. Dubus
INVENTOR
George Lispenard
BY Joseph L. Levy
ATTORNEY (No Model.) 6 Sheets—Sheet 6.
G. LISPENARD.
COTTON HARVESTER.
No. 517,409. Patented Mar. 27, 1894.
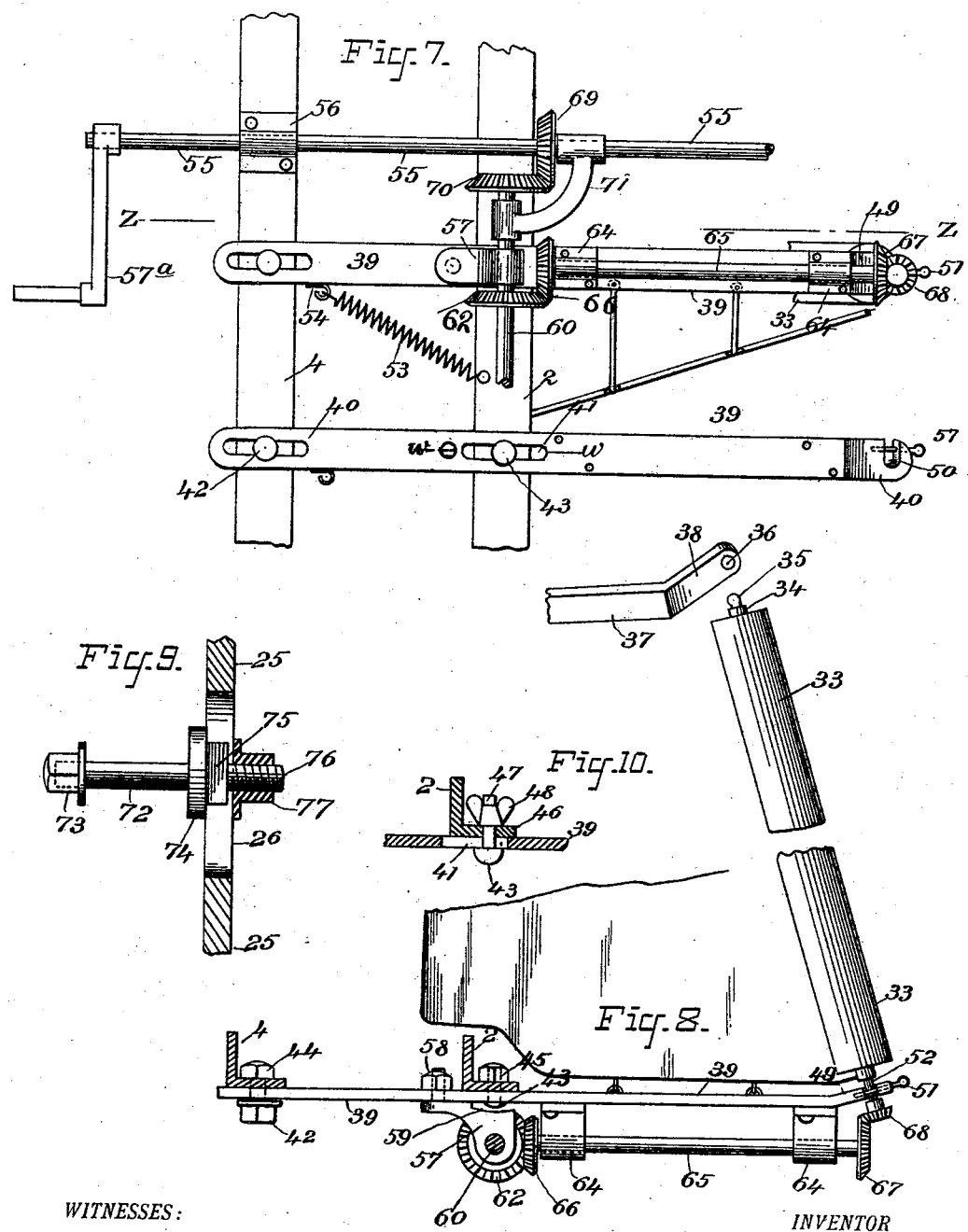
WITNESSES:
M. F. Daly
H. F. Dunbar
INVENTOR
George Lispenard
BY Joseph L. Levy
ATTORNEY

UNITED STATES PATENT OFFICE.

GEORGE LISPENARD, OF BROOKLYN, NEW YORK, ASSIGNOR, BY MESNE ASSIGNMENTS, TO THE WALLIS-LISPENARD COTTON PICKER AND MACHINERY COMPANY, OF NEW JERSEY.

COTTON-HARVESTER.

SPECIFICATION forming part of Letters Patent No. 517,409, dated March 27, 1894.

Application filed August 13, 1891. Serial No. 402,517. (No model.)

*To all whom it may concern:*

Be it known that I, GEORGE LISPENARD, a citizen of the United States, residing at Brooklyn, in the county of Kings and State of New York, have made certain new and useful Improvements in Cotton-Harvesters, of which the following is a specification.

My harvester belongs to that class of devices which are so constructed as to straddle the rows of cotton, and which carry upon them picking instrumentalities, so that the cotton can be automatically picked from the bush and be conveyed to some part of the machine. It is very desirable to construct a machine that will pick cotton under the conditions hereinafter mentioned. It is well known that the cotton plant extends its limbs out from its central stalk at almost right angles to the same, that the bolls in which the cotton is located are found to grow on the stalks on the ends and at almost any part of them up to near the central stalk, and that at various times during the ripening season of the cotton, the bolls on the lower part of the plant ripen before the bolls on the upper part of the plant. Furthermore, the green cotton should not be picked, but the ripe cotton only, and the boll branches and leaves should be uninjured during the picking operation; also the height of the cotton plant differs in different fields. All these various conditions may be accommodated in my machine, and it has been constructed with a view to accomplish the same. Furthermore, a very important element in the manufacture of cotton harvesters is to cheapen the cost of their construction, to make them light, portable, possessing simple action, and to make them manually operative, so that the expenses of running the same are materially reduced.

To secure an efficient operation, and to adapt the machine to long continued use, it is necessary that the frame of the machine shall be strong, light, and rigid, because it is essential that the machine shall be able to accommodate itself to the various conditions of the ground upon which it is moved and the straightness or crookedness of the rows of plants.

The present invention, therefore, consists of various improvements having as their incentive the accomplishment of the above mentioned objects, as will be hereinafter more fully pointed out and claimed.

Figure 2:
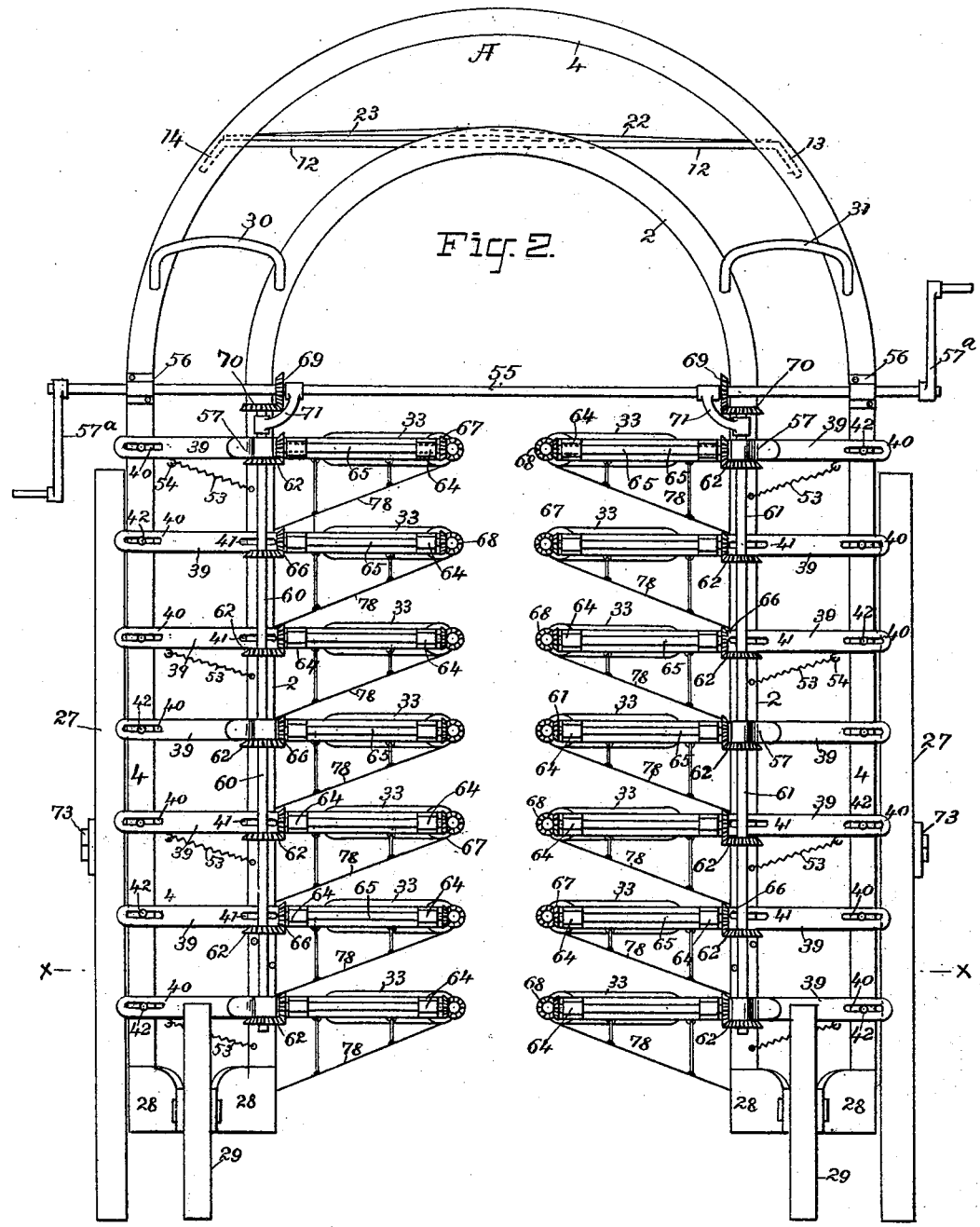

In the drawings, Figure 1 is a front elevation of the harvester. Fig. 2 is a rear elevation of the same. Fig. 3 is a horizontal cross section taken on the line $x\ x$ Fig. 2. Fig. 4 is a plan view with the trailing wheels removed. Fig. 5 is a side elevation of the frame and wheels, illustrating the relation of those parts, with the picking instrumentalities omitted for the sake of clearness of illustration. Fig. 6 is an end elevation of the frame, the wheels and picking instrumentalities being omitted. Fig. 7 is an end elevation of details of the frame and supports for the picking instrumentalities, and devices for operating them. Fig. 8 is a horizontal section of the same, taken on the line $z\ z$ Fig. 7. Fig. 9 is a sectional-detail view of mechanism for adjusting the height of the harvester above the ground taken on the line $y\ y$ Fig. 5. Fig. 10 is a detail view taken on the line $w\ w$ Fig. 7. Fig. 11 is a plan and side elevation showing the relation of a picker-stem and a deflector.

As before stated, in order to secure efficient operation, lightness of structure, portability, &c., I have devised a strong rigid frame, which as a whole I shall indicate by the letter A. The frame is preferably made of angle iron wherever such can be used, as by that means I obtain strength and lightness; and it is composed as follows: The front and rear parts of the machine consist of inner arches 1 and 2 and outer arches 3 and 4. Between the inner arches are disposed longitudinal braces 5 and 6, preferably of angle iron, and between the outer arches are longitudinal braces 7 and 8. This construction is plainly seen in Fig. 3 in plan view, and elevation in dotted lines in Fig. 6. The outer arches are also braced longitudinally by the braces 9 and 10 disposed near the top.

To secure further rigidity between the inner and outer arches at both ends of the machine transverse braces 11 and 12 are used, the brace 11 being secured to the arch 1 at the top of the same, and to the arch 3 on its inner side, the brace 12 being secured to the arch 2 at the top of the same, and to the arch 4 on its inner sides, the brace 12 being secured to the arches 2 and 4 in a like manner, connection with the arches 3 and 4 being shown in dotted lines 13 and 14, Fig. 2.

To firmly unite the inner, outer, front and rear arches, cross braces 16, 17, 18 and 19 are secured to the inner and outer arches on both ends of the frame at the bottom, and which are united together at 20, 21 and cross braces 22, 23, uniting the outer arches at the front and rear at the top thereof, and which are secured together at 24. The frame is also provided with an upwardly extending plate 25, Figs. 3 and 5 having a slot 26 in which the axles of the large or carrying wheels 27 are adjustably secured.

At the rear end of the frame Fig. 5 is secured a rearwardly bracket 28 having a trailing wheel 29 (shown only in outline). A like bracket and wheel are preferably located on both sides of the end arches. The frame may also be provided with handles 30, 31, extending transversely across the end arches, as shown in Fig. 2; or they may be arranged perpendicularly as shown at 32, Fig. 5.

The arrangement for raising and lowering the frame of the axle of the wheel will be hereinafter described.

It will be seen from Fig. 5 that the journals of wheels 27 are located in the frame forward of the central line of the same. The object of this is to bring the inclination of force, due to the weight of the machine in a rearward direction, it being taken up by the trailing wheels 29; that is, rearwardly extending force will be taken up by the wheels 29, and the downwardly extending force by the wheels 27. This will enable the machine being pushed behind, without endangering it, or causing the machine to lurch forward, also giving it a good hold upon the ground; and, furthermore, the peculiar location of the journals of the large wheels enables the frame to be brought down in a longitudinal position, by swinging it forward upon its axes, without touching the ground, so that the whole machine can be pulled along the ground by a person taking hold of the front part of one of the arches, thus bringing the frame horizontal with the ground whereby its removal from the field will be facilitated. It will be easily seen that this is a very desirable feature in machines of this class.

The peculiar structure of the frame admits it to be turned about so as to accommodate the picking instrumentalities carried upon it to various conditions of the growth of the plants and the ground. Thus, if the rows of plants are at all irregular, or if there is more ripe cotton on one side of the bush than on the other the frame of the machine being extremely narrow may be turned about with one of the wheels acting as a pivot, so as to direct the picking instrumentalities on one side against the bush, or vice versa; or should it be desired while operating the machine, to present the picking instrumentalities located near the top of the machine to the ripe cotton in advance of those at the bottom; it is only necessary to tilt the machine on the large wheels, raising the trailing wheels from the ground in the act of doing so.

As before stated, the ripe cotton is found to grow on all parts of the bush, as well as on the outside, and in order to get at the cotton located inside the bush, and avoid as well the necessity of jamming or pushing the picking instrumentalities into the bush, thereby breaking green bolls, twigs, &c., I so arrange the picking instrumentalities that they shall approach toward the central longitudinal axis of the machine as they extend rearward; in other words, the picking instrumentalities are made to diverge from the rear end of the machine outward until they form, as seen very plainly in Figs. 3 and 4, a V shaped inclosure.

In order to further insure against injury to the green plant, &c., I pivotally support the picking instrumentalities at their forward ends, and adjustably secure them in their supports. This makes the picking instrumentalities very flexible, permitting them to give to the inequalities of the bush, and to pick the cotton without bringing any undue strain or pressure to bear upon them which I consider a very valuable feature of my invention, and also to enable them to move laterally to pick cotton on various parts of the bush.

I will now proceed to describe the picking instrumentalities, their method of suspension and operation. The picker stems 33 are of the constantly rotating class, in contradistinction to ones that are intermittently rotated, and they may have the form or structure shown in either one of my applications filed November 15, 1890, Serial Nos. 371,504 and 371,501 respectively; but I prefer that structure which is shown in my application Serial No. 371,505, filed November 15, 1890.

By reference to Fig. 8 it will be seen that the front end of the picker is provided with a spindle 34 having a ball shaped extension 35. This ball shaped extension fits within the countersunk socket 36 which may be either spherical or cylindrical formed in the end of the bar hanger 37, the end being bent at 38, as shown in this figure and in Fig. 3, to accommodate the angular position of the picker stem.

By reference to Fig. 1 it will be seen that the bar hangers 37 are secured to the front arches 1 and 3 of the frame, and extend transversely of the machine. The entire front space of the frame may be occupied by the pickers and bar hangers according to the height of the plant to be operated upon. The front end of the picker is provided with guards 38ª, which guards extend over the front end of the picker, so as to prevent sprigs, leaves and branches, &c., from getting into the bearings and also to facilitate the entry of the pickers into the bush.

Means for adjustably supporting the pickers is shown in elevation in Fig. 2, and in detail in Figs. 7, 8 and 10. This comprises (as to one picker) the transversely extending bar hanger 39, adjustably secured to the arch bars 2 and 4 of the frame on each side thereof. The bar hanger 39 is provided with slots 40 and 41, which engage studs 42 and 43 secured to the arch bars 2 and 4. These studs are secured to the arch bars 2 and 4 by means of nuts 44 and 45; or, if it is desired to provide means whereby the studs may be expeditiously disengaged from the arch bars and hangers, the form shown in Fig. 10 may be used, in which the stud 43 is shown as having a square section 46, a threaded extension 47, with a thumb nut 48 upon it, so that by unscrewing the thumb nut, the stud may be removed. The supporting end of the bar hanger 39 has a forwardly bent portion 49, which is provided with a slot 50 and pin 51. By means of this slot bearings are provided for the spindle ends 52 of the picker stem 33, the pin 51 being placed in holes provided for it through the end of the hanger bar, so as to confine the last mentioned spindle in place in its bearings, and also to provide means whereby it may be readily disengaged. The hanger bars 39 are adjustable transversely, and they are so adjusted for the purpose of making them flexible, whereby they will give to the inequalities of the bush, &c., as before set forth. They are kept in their normal outward position by means of springs 53, secured at one end of the arch bar 2, and detachably secured at the other end to the hook 54 on the hanger bar 39. These springs cause the ends of the pickers on one side and at the rear end of the machine to approach the center of the frame as near as the slots in the hanger bars will permit their approach to the center, to a greater or less extent, being regulated by the length of these slots. As this is but a mere matter of adjustment, they can be made to approach as close to the center as desired. The rear ends of the pickers on the opposite side simultaneously move away from the center of the machine.

As before stated, at certain seasons of the year during which the cotton ripens, it will be found that the cotton is in a condition to pick on some parts of the bush earlier than on other parts; and in order to provide picking instrumentalities whereby, say for instance, the cotton on the lower part of the bush may be picked without disturbing the boll, branches, or leaves, on the upper part of the bush, I so construct the method of suspending the picker stems that they may be disengaged, or removed, and the back hanger bars dropped down and out of position, so as not to be in the way of operation of the machine, or to strike against the bush. By means of the construction shown in Figs. 8 and 10, the hanger bar 39 can be unloosened from the arch bar 2 by unscrewing the thumb screw 48 or nut 45 and it can then be dropped downward, which will get it out of the way, the picker being preferably previously removed by removing the pin 51 in the end 49 of the bar 39, and the ball shaped extension 35 of the spindle 34 being moved away from the countersunk socket 36. By this arrangement it will be seen that the pickers at any point on the machine may be removed and the rear hanger bar can be dropped down. The bar can also be removed entirely by removing the holding nuts. If desired, the stud 42 and nut 44 may have the same structure as those shown in Fig. 10, so that the hanger bar may be removed expeditiously; and also the front bar 37 may be so provided with devices whereby it can be dropped down or entirely removed.

The following comprises the means for rotating the picker stems: 55 is a transversely extending shaft loosely secured in the bearings 56 provided for it on the arch bar. Said shaft is provided with handles 57ª at each end, whereby it is rotated. One handle or crank may be used at either end, and if handles are placed upon both ends of the shaft they will be preferably set as shown in Fig. 2. Each hanger bar 39 is provided with bracket bearings 57, which are secured to the hanger bar 39 by bolts, as at 58, Fig. 8. The bracket 57 is cut away on its inner face, as at 59, to any desired degree, to enable the stud 43 to work past it in its slot. All of the bars 39 on each side of the machine are not shown as being provided with brackets 57. This is here done for the sake of preventing confusion in the drawings. Also some of the springs are omitted. It must be understood that all the similar parts are constructed identically the same.

Extending up through the brackets 57, and free to revolve therein, are upright shafts 60 and 61, having upon them the miter wheels 62. The bar 39 is also provided with bearings 64, in which the transverse shaft 65 is free to turn. This shaft is provided at one end with miter wheels 66 for engagement with the miter wheels 62 on the upright shaft, and at the other end with miter wheels 67 for engagement with the miter wheels 68 on the end of the spindle 52 of picker stem 33. The transverse shaft 55 is provided with miter wheels 69, secured thereto which engage with miter wheels 70 on the upright shafts 60, 61. Brackets 71 are placed upon the transverse shaft 55 and upright shafts 60, 61, their ends encompassing the same, and permitting the shafts to turn freely within them. These brackets unite the transverse shaft 55 and upright shafts 60, 61 together, and any movement that is given to any one of these shafts in either direction is transferred to them all.

The means for operating the pickers and devices for supporting such means, as just described, are secured in the manner set forth to the bars 39, so that when any one of the bars moves inward or outward it carries with it the shafts and pickers, such vibration being made from the front end of the picker stem as a stationary point of fulcrum. Thus, it will be seen that the picker stems themselves and the means for operating them, move simultaneously to allow for any undue pressure on the pickers when they are in contact with the bush, or such movement may be transferred to them by means of the transverse shaft 55.

As before set forth, the frame is made vertically adjustable on the wheels. This is done by means of the device illustrated in Fig. 9, although any other device may be used. Here the bar 25, shown in side elevation in Fig. 5, is shown in cross section through the slot 26. 72 is the axle or spindle of large wheel 27, having the washer and nut 73 on its outer end, and a washer 74 placed upon the spindle against the bar 25, but larger in diameter than the width of the slot 26. The spindle is also provided with a block 75 fitted to slide up and down in the slot 26, so as to keep the spindle from turning, and a threaded extension 76 carrying the washer nut 77 larger in diameter than the slot 26. It will be seen from this arrangement, which may be duplicated on both sides of the machine, that by loosening the nuts 77 the frame may be raised or lowered in relation to the wheel 27, thus permitting it to operate upon bushes of various heights; or to accommodate the machine to inequalities of ground one of the spindles 72 may be located higher or lower than the other. This will be of special advantage if the ground on one side of the bush is higher than that on the other. This arrangement also permits the frame to be vibrated on the wheels. After the cotton has been picked from the boll by the pickers 33 it either drops off the picker, or is relieved from contact with the face of the same by the deflector 78, which is inclined at a suitable angle so as to direct the cotton down into any suitable receptacle made for it at the bottom of the frame. The deflector 78 can be made of thin sheet iron and fastened in any desired way to any suitable part of the machine, so as to lead down to the space between the framing, wherein the picked cotton is deposited. In Figs. 1, 7, 8, and 11, I have shown the deflectors supported by rods loosely suspended from the bar hangers 37, 39.

In the various figures illustrating them, the slots are not shown in contact with the studs. This is done simply to illustrate their mode of action.

Having thus described my invention, I claim—

1. In a cotton harvester, a frame having picker stems arranged on each side thereof, and devices for simultaneously operating said picker stems to pick the cotton, said devices and picker stems being laterally adjustable all in the same direction together, said adjustment and operation being independent of each other, substantially as described.

2. A frame having a series of individual picker stems arranged on each side thereof, a rigid support for one end and a movable support for the other end of each picker, and means for moving the movable ends of all the pickers simultaneously in the same direction, substantially as described.

3. A frame having opposing picker stems extending from the rear toward the front thereof and diverging from the rear to form two converging walls, a rigid support for the front end and a movable support for the rear end of the pickers, and means for moving the movable ends of all the pickers simultaneously in the same direction, substantially as described.

4. A cotton harvester having picker stems extending from the rear to the front thereof, the front ends of each picker stem having a fixed support, a support for the rear end of each picker stem, and means for moving the rear ends of the picker stems in one direction and springs for moving them in the opposite direction, substantially as described.

5. The combination of a rotary picker stem 33 having a spindle 34 and ball 35 at one end, the fixed hanger bar 37 having the obliqued extension 38 for supporting the front end of the stem, a socket in said extension, the rear hanger bar 39 having the oblique extension 40 and bearings 50, a spindle 52 on the rear end of the stem resting in said bearings, and a supporting frame for the bar 39, substantially as described.

6. The picker stem 33 suitably supported, having the pinion 68 and means for rotating said picker, comprising the transverse shaft 55, miter wheel 69 thereon, upright shaft 60, miter wheel 70 thereon engaging miter wheel 69, bracket 71 embracing the shafts 55, 60, the transverse shaft 65, bearings 64 for the same, miter wheels 62, 66 connecting the shafts 60, 65, and miter wheel 67 meshing with the pinion 68, all located at the rear of the machine substantially as described.

7. A frame having the front hanger bars 37, the rear hanger bars 39, both front and rear bars extending from each side toward the middle and not meeting there but leaving a clearance space for the cotton bushes, the transverse part of the frame being wholly above the said bars the horizontal and obliquely disposed picker stem supported at the ends by both bars, the bars 39 being movable and the bars 37 fixed, substantially as described.

8. A frame having the front hanger bar 37, the rear hanger bar 39, slots in said bar for permitting its movement on the frame, a picker stem supported by the hanger bars, and a spring 53 secured at one end to the frame and at the other to the bar 39, substantially as described.

9. The transverse shaft 55 with a handle 57ª rotatably supported on the frame, an upright shaft 60, a gear wheel 70 on the upright shaft, gear wheels 69 on the transverse shaft meshing with the wheels 70, the bracket 71 rotatably engaging both shafts, immediately behind said gear wheels, both shafts being laterally movable on the frame the hanger bar 39 secured to the frame, a picker stem supported on the frame, the bearings 57 for the shaft 60 secured to the hanger bar 39, and gearing between the picker stem and shaft 60 for operating the picker stem, substantially as described.

10. The frame sections 4, 2, the hanger bar 39 for movably supporting one end of a picker stem secured to the frame sections, the other end of the picker being supported in a fixed point the said bar being slotted for the passage of bolts, and the removable bolts 42, 43, detachably securing the bar 39 to the frame sections, the hanger bar being movable on the bolts, and means for moving the hanger bars, substantially as described.

11. The combination, with front and rear inner and outer arches of the frame, of transverse bars on each side uniting the front arches and likewise transverse bars uniting the rear arches, the latter bars approaching each other toward the center of the frame nearer than do the former, whereby are formed supports for converging walls of picker stems, substantially as described.

12. A frame comprising a plurality of series of arched bars, one bar of one of the series being located within or below the other, and transverse bars uniting the arched bars and prolonged within the same, in combination with picker stems supported on the inner ends of the braces, substantially as described.

13. The combination, with the arches 1 and 3 of the frame, of the transverse bars 37 uniting said arches carrying guards 38$^a$ on their inner ends, and picker stems journaled in the bars behind the guards, substantially as described.

14. A frame having front and rear upright members, inwardly extending bars 37 secured to the front members, inwardly extending bars 39 secured to the rear members, the bars 39 being capable of a movement across the longitudinal center of the frame, substantially as described.

15. A frame, a bar 39 supported on the frame and transversely movable thereon, a picker-stem supported at one end of the frame in a fixed point, and at the other end to the bar 39, and means for rotating the picker-stem and moving it transversely comprising the transverse shaft 55, miter wheel 69 thereon, shaft 60, miter wheel 70 engaging miter wheel 69, bracket 71 embracing the shafts 55, 60, the transverse shaft 65, bearings 64 for the same, miter wheels 62, 66 connecting the shafts 60, 65, and miter wheels 67 meshing with the pinion 68, substantially as described.

16. A frame, a bar 39 supported on the frame and transversely movable thereon, a picker-stem supported at one end of the frame in a fixed point, and at the other end to the bar 39, means for moving the picker-stem and bar 39 in one direction, and a spring secured to the bar and to the frame for moving them in the contrary direction, substantially as described.

Signed at the city, county, and State of New York this 7th day of August, 1891.

GEORGE LISPENARD.

Witnesses:
 JOSEPH L. LEVY,
 M. F. DALY.